United States Patent [19]

Elko et al.

[11] Patent Number: 5,392,397
[45] Date of Patent: Feb. 21, 1995

[54] COMMAND EXECUTION SYSTEM FOR USING FIRST AND SECOND COMMANDS TO RESERVE AND STORE SECOND COMMAND RELATED STATUS INFORMATION IN MEMORY PORTION RESPECTIVELY

[75] Inventors: David A. Elko, Poughkeepsie; Jeffrey A. Frey, Fishkill; Audrey A. Helffrich, Poughkeepsie; Jeffrey M. Nick, Fishkill; Michael D. Swanson, Poughkeepsie, all of N.Y.

[73] Assignee: International Business Machines Corporation, Armonk, N.Y.

[21] Appl. No.: 860,378

[22] Filed: Mar. 30, 1992

[51] Int. Cl.$^6$ ............................................. G06F 13/00
[52] U.S. Cl. ..................... 395/200; 395/375; 395/575; 364/240.9; 364/246.5; 364/247.3; 364/DIG. 1; 371/16.5; 371/24; 371/29.1
[58] Field of Search ............... 395/425, 325, 275, 200, 395/575, 375, 800, 500, 650; 364/200, 240.9, 246.5, 247.3; 371/16.5, 24, 29.1

[56] References Cited

U.S. PATENT DOCUMENTS

| | | | |
|---|---|---|---|
| 4,400,773 | 8/1983 | Brown et al. | 364/200 |
| 4,423,480 | 12/1983 | Bauer et al. | 364/200 |
| 4,648,031 | 3/1987 | Jenner | 364/200 |
| 4,697,266 | 9/1987 | Finley | 371/12 |
| 4,785,394 | 11/1988 | Fischer | 364/200 |
| 5,155,810 | 10/1992 | McNamara et al. | 395/250 |
| 5,170,472 | 12/1992 | Cwiakala et al. | 395/275 |
| 5,204,950 | 4/1993 | Kawashima | 395/200 |
| 5,278,958 | 1/1994 | Dewa | 395/275 |
| 5,301,326 | 4/1994 | Linnett et al. | 395/700 |
| 5,313,588 | 5/1994 | Nagashige et al. | 395/275 |

OTHER PUBLICATIONS

IBM Technical Disclosure Bulletin, vol. 24, No. 5, Oct. 1981, pp. 2404–2406.

Primary Examiner—Thomas C. Lee
Assistant Examiner—Moustafa M. Meky
Attorney, Agent, or Firm—Floyd A. Gonzalez

[57] ABSTRACT

One or more Central Processing Complexes (CPC), each with one or more programs being executed, become command initiators by issuing commands requesting an action to be performed by a command responder. The responder is a Structured Electronic Storage (SES) which comprises a coupling facility. The SES receives commands to be executed over a plurality of links interconnecting the CPC's and SES, and returns a response to the program that issued the command. The SES is the focal point for the CPC's to share data, control locks, and manipulate lists or queues. This couples the autonomous CPC's into a System Complex (Sysplex) displaying a single system image. An indicator associated with each of the links is set by SES when it appears to a initiator that problems on the link exist. The set state of any indicator prevents SES from starting execution of any subsequent commands. This preserves the orderly, sequential execution of commands to insure consistent states of data in SES, and allows the program that issued the command to determine exactly how the command ended at SES. Data associated with execution of the command is stored in a status save area of SES for subsequent access by the program.

7 Claims, 4 Drawing Sheets

COMMAND EXECUTION SYSTEM FOR USING FIRST AND SECOND COMMANDS TO RESERVE AND STORE SECOND COMMAND RELATED STATUS INFORMATION IN MEMORY PORTION RESPECTIVELY

FIELD OF THE INVENTION

This invention relates to interconnection of data processing systems through a coupling facility, and more particularly to maintaining consistency of data and control structures in the coupling facility when there are real or suspected errors in the links that form the interconnections by informing a program of real ending status of a command not previously received.

BACKGROUND OF THE INVENTION

In a data processing system, data and system control structures may be shared between several programs running on a single central processing complex (CPC), or shared between several CPC's using a shared facility.

Commands are communicated over a link to the shared facility through channel apparatus. The channel expects a response to the request from the shared facility resulting from execution of the command. If a response is not received within some predetermined time, or the channel detects signal errors on the link, it will notify the program of the error condition. At this point the program must recover the failed command and free resources that are held for the command. If the command is still in execution at the shared facility after the error is presented, the program is faced with significant difficulties in completing the recovery action.

The shared facility provides a program controlled command execution processor which accesses the shared control and data structures. The shared storage is comprised of system storage for system-wide or global control structures, and storage for CPC-program created data and list structures. All of these structures can be shared among programs in one CPC, or among plural CPC's. Commands are received over a plurality of links. Link buffers are provided to receive commands and/or data, and store responses for transfer over the link to a CPC and/or program. When the shared facility interconnects a plurality of CPC's, a system complex (Sysplex) is created to form a single system image from all of the autonomous CPC's.

Consider the situation where a program has obtained a lock to serialize a shared data item X. After the serialization has been obtained, the program attempts to update the contents of X in the shared facility by issuing a command to write X to the shared storage and store new values for X in its existing location. However, an error is presented to the program while the command is still executing. Recovery for the command releases the serialization to make the data available for other programs.

A second program running on a different CPC obtains the serialization for X. Once serialization is obtained, the program assumes that it will have a consistent and unchanging view of the data item X. The program may wish to read X, update X, or even delete X. In each case, the continuing execution of the previously failed command may cause problems. For instance, two successive reads of X may see different values if a store occurs between the read operations. The program would see this as an error since it owns the serialization for the data. Another problem would occur if the program attempted an update of X by reading X, updating X in main storage and then writing X back to the shared facility. A subsequent store by the previous command could cause the update to be lost. Finally, if the second program chose to delete X, re-execution of the failed command may restore an old version of X after the delete had occurred. In each case, correct actions by the second program would be construed as errors.

It is therefore very important that a function and system be provided in the shared facility that maintains consistency of data or control structures. A program that initiates an action in the shared facility must be able to determine whether a command was received, received and completed, or received but aborted. The program must eventually receive the results of the action, or determine that the action must be requested again.

SUMMARY OF THE INVENTION

An object of the present invention is to preserve consistency of control and data structures in a facility shared by a plurality of programs when real or apparent errors in a link between the programs and shared facility occurs.

A more specific object of the invention is to provide a command responder that receives commands for execution from a plurality of command initiators on a plurality of links, and at a command initiators election, saves status and/or data related to commands for subsequent retrieval by a command initiator if a normal response is not communicated by the command responder.

These objects and other features and advantages are included in a preferred embodiment of the invention that is comprised of a structured electronic storage (SES) that interconnects, and is shared by, a plurality of central processing complexes (CPC's). This coupling of autonomous data processing systems into a system complex (Sysplex) creates a single system image to a user.

SES functions as a command responder to a plurality of command initiators in the form of programs operating in one or more CPC's. Each CPC transmits commands to SES over one or more message transmission links. A CPC channel expects to receive a response from SES within a predetermined time after transmitting a command for execution. If the response is not received in predetermined time, or the channel detects other errors, this fact must be communicated to the requesting program. Although there may be an actual problem on the link that sent the command, the delay in the response may be the result of SES being too busy and that execution of the command may still be in process. The CPC channel takes steps to delay notifying the program of the error until it is known the command has ended execution, either to accurate completion, or has been negated by returning all SES data to the state it was before the command was received.

SES is comprised of a bulk, electronic storage, stored program SES processor for executing commands, and link hardware for communicating with CPC's. The bulk storage has global or system-wide control and data structures, and command initiator generated data structures. All of the structures in SES can be shared and manipulated by all the initiators, and where possible allows for concurrent execution of commands in SES. A consistent and accurate view of shared structures can be maintained by the well known use of locks that prevent access to certain structures by a program when another is in the process of manipulating the structure. As mentioned earlier, locks do not prevent an inconsistent view of data as between two initiators when one attempts a recovery from what appears to be an error on the link. This is because the command thought to be in error may in reality only be delayed. Subsequent execution of such a delayed command violates the ordering controlled by programming based on command completion.

Consistency of data or control structures in SES is maintained in situations that appear to be link errors by providing a command quiesce function in SES (see co-pending application Ser. No. 07/860,330 now U.S. Pat. No. 5,339,405) with the same inventors and assignee as this application. When a CPC channel suspects a link error, signals are transmitted to SES which are interpreted by the link hardware as a request to quiesce the command received on the link. This causes SES to set an indicator associated with the link. When a subsequent command is received on any other link, the SES processor servicing that command scans all indicators, and prevents the start of command execution if any are found set.

After the request for command quiesce has been received, the command may in fact complete correct execution, or any changes made before quiesce will be undone to return structures to the status they were in before the command was received. When this is done, the indicator will be reset. At the option of a CPC program, retry buffer area in SES can be set aside to accumulate data and status as a command executes in SES. After the quiesce operation, the program can access the saved data or status and determine what further action if any is required for recovery. The program may receive results and status of complete execution of the command, or determine that the command must be sent again.

The detailed description of the present invention will show several desirable features that make for efficient handling of retry capabilities. Setting aside a retry buffer is at the option of a particular program issuing a series of commands. Storage space for retry buffers for all programs is not required. The granularity of retry information is each command. The buffer may be relatively small by not requiring the tracking of all commands of a series of commands. All commands do not have to be retried since data associated with a completed command is made available by access to the retry buffer. If the command response is not received because the link over which it was issued does fail, the initiator can retrieve the data in the retry buffer over another functioning link.

DESCRIPTION OF THE PREFERRED EMBODIMENT

Figure 1:
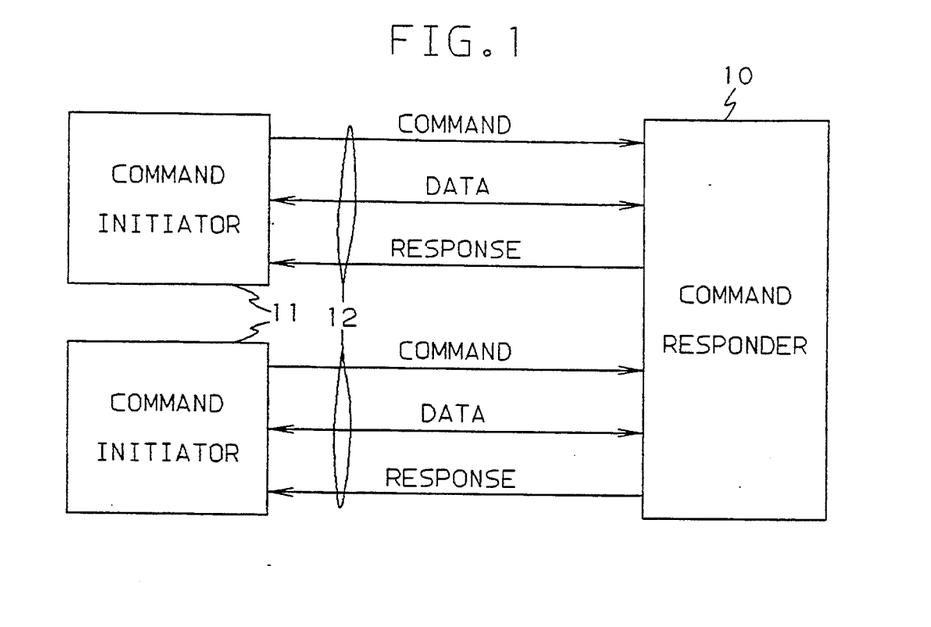
FIG. 1 is a block diagram for describing a general environment for practicing the present invention.

The block diagram of FIG. 1 depicts a generalized environment which can implement the present invention to advantage. It is comprised of a command responder 10 that responds to commands received from one or more command initiators 11 over one or more links 12. The actual configuration of a link 12 can take a number of forms. The link 12 could be a large parallel bus or a fiber optic pair that transmit in serial fashion or a bundled number of such links. In any case, the command responder 10 will receive a command to be executed at the request of a command initiator 11, with or without data, and provide a response back, with or without data. There can be a single command initiator 11 that transmits a plurality of commands in sequence, or more than one initiator 11 as shown. Either way, it is essential to preserve the proper sequence of command execution at the responder 10 in situations where there is a real or apparent problem on a link 12 as viewed by a command initiator 11.

Figure 2:
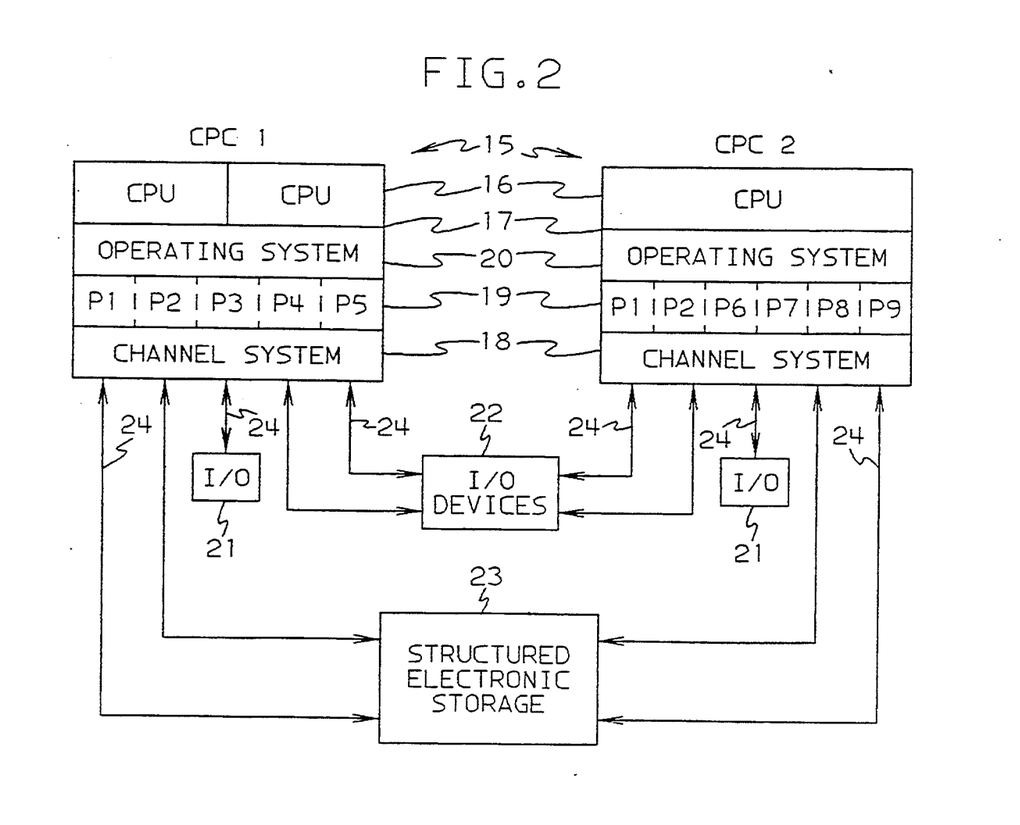
FIG. 2 is a block diagram of a data processing system complex that incorporates the present invention to provide shared usage of system-wide data and control structures.

The block diagram of FIG. 2 provides more detail of a preferred environment for practicing the present invention. It depicts the coupling together of at least two autonomous data processing systems into a system complex (Sysplex) that exhibits a single system image to a user. Autonomous data processing systems 15 are designated as Central Processing Complex (CPC) 1 and 2. CPC 1 and 2 can each be an International Business Machines ES/9000 data processing system.

An ES/9000 data processing system 15 is comprised of one or more Central Processing Units (CPU) 16, a main memory 17 and a channel system 18. Main memory 17 stores data which is manipulated by a plurality of stored application or utility programs 19 (P1-P9), all under the control of an operating system 20 such as the IBM MVS/SP control program. In a Sysplex environment, where fault tolerance and/or increased performance is desired, some of the programs 19 such as P1 and P2 may be duplicated in the systems 15.

The channel system 18 is comprised of a plurality of channel sub-systems (CSS) which connect each system 15 with various peripheral units. Certain of the peripheral units may be various I/O units 21 such as magnetic tapes, printers, direct access storage devices (DASD), or communication control units to provide connection of user terminals for example. Some I/O devices 22 may be shared by the two systems 15. The channel systems 18 are also shown in FIG. 2 to be connected to a Structured Electronic Storage 23 (SES) to be more fully described as part of the preferred embodiment of the present invention.

The paths 24 in FIG. 2 that connect the systems 15 to the various peripheral units are preferably fiber optic cable pairs that provide for serial, bidirectional transfer of information between the units. Commonly assigned U.S. Pat. Nos. 5,003,558 and 5,025,458 are incorporated by reference herein for their showing of various aspects of a CSS for synchronizing and decoding of serial data transmission between the systems 15 and, for example SES 23. The transmission of plural-byte message frames are the means for communicating commands and responses referred to in connection with FIG. 1.

Comparing FIG. 2 with the previous discussion of FIG. 1, the command responder 10 would be SES 23 or the shared I/O devices 22. The links 12 of FIG. 1 are the paths 24 of FIG. 2. In FIG. 2, a command initiator 11 of FIG. 1 could be viewed as being a system 15, program 19, or a CSS of channel system 18.

Figure 3:
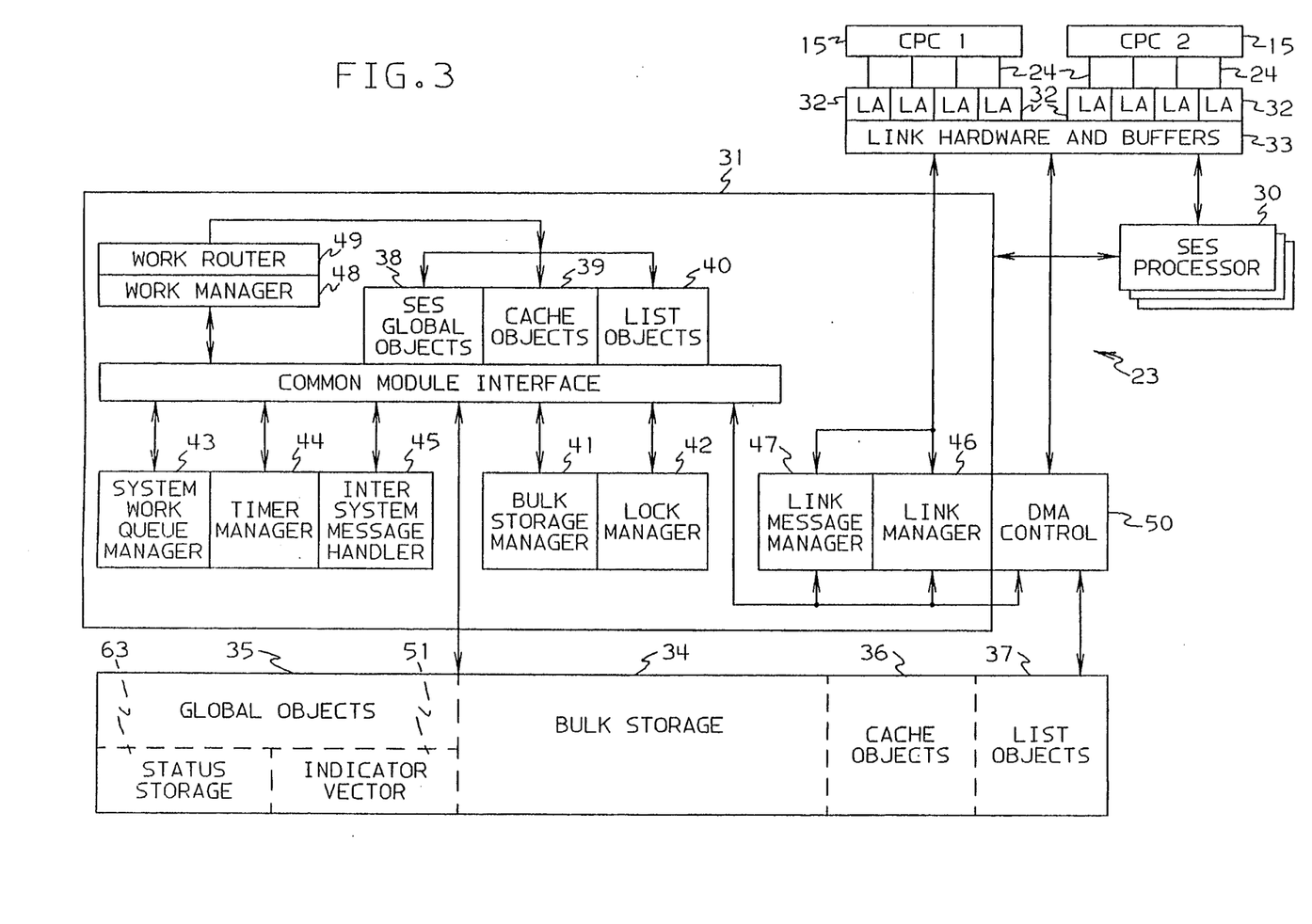
FIG. 3 is a block diagram of a Structured Electronic Storage (SES) depicting a processor and programming required to practice the present invention.

FIG. 3 is a block diagram of the Structured Electronic Storage (SES) 23 shown in FIG. 2. It depicts some of the functional hardware and stored programming which makes SES an intelligent bulk storage that is shared by several autonomous systems to create a Sysplex.

The intelligence of SES 23 is provided by one or more SES processors 30 with program and data storage 31 which executes commands received by SES from command initiators represented in FIG. 3 by CPC 1 and CPC 2 (data processing systems 15 of FIG. 2). Command and response messages transmitted serially over fiber optic cable pairs 24 interconnect a channel sub-system (CSS) of a system 15 with a corresponding link adapter (LA) 32. Link hardware and buffers 33 include comparable hardware to that in a CSS for synchronizing and decoding serial bits received on the fiber optic links 24. One or more link buffers can be provided for each link 24. Each buffer includes a section for receiving and storing a command, a section for storing a response for transmission to a CPC, and a section for storing data involved in any command or response.

In the environment of a Sysplex, and in order to achieve effectiveness at being able to spread workloads across multiple systems 15 and share the data among them, several data and control structures are centralized in SES 23. These structures are represented by data and control objects stored in a bulk storage 34 in SES 23. Bulk storage 34 is electronic and non-volatile by virtue of providing backup battery power in case of power system failure.

As shown in FIG. 3, objects stored in storage 34 can include global objects 35, cache objects 36, and list objects 37. These objects can be manipulated by commands received at SES 23 which are executed by the SES processor 30 in response to program sequences 38, 39, and 40 respectively in storage 31. Global objects 35 provide for overall Sysplex control. Cache objects 36 with associated directories provide for an intermediate level of caching as between DASD and the caches associated with individual CPU's of systems 15. Data consistency is maintained for data that is being shared and cached at various levels. List objects 37 could be various work queues being manipulated by various systems 15. As various objects are created, modified, or deleted in bulk storage 34, a bulk storage manager program sequence 41 will create/delete space and addressability to the objects in response to commands received by SES. Lock manager 42 will respond to commands that require various objects to be locked against access by any other command initiator until a present access is completed.

Certain overall Sysplex controls are executed by program sequences in storage 31 relating to system work queues 43, timers 44, and intersystem message transmissions 45. As commands are received by the link hardware and buffers 33, and analyzed by link manager 46, and link message manger 47 program sequences, a work manager 48 and work router 49 will initiate the proper program sequence to be executed by the SES processor 30. Transfer of data between the bulk storage 34 and data section of a link buffer 33 is performed by a DMA control 50.

In a Sysplex environment supported by multiple systems 15 comprised of multiple CPU's and programs accessing SES, it is required that programming requests to modify the content of objects in SES are viewed in strict order. A command may access several objects in bulk storage 34, and the accesses must appear to be atomic as viewed by all command initiators. No store accesses for another command are permitted to any of the objects during the time that any of the objects are being fetched or stored by a previous command. No fetch accesses are permitted to any store type objects during any time the objects are being stored. The objects accessed by one command must occur after those of all preceding commands and before those of all subsequent commands as observed by any command initiator.

When data is shared between multiple users, it is essential that each user's access and update be done serially with respect to other users. To control this, systems that provide for the sharing of data across multiple users (which can be in a single or multiple systems) use locking mechanisms. A user must be granted a lock from the system prior to accessing the data. This lock will be granted to each user by the system one user at a time, thus insuring serialization. In a single system, these locks can be maintained in a systems main storage thus providing very high performance. Across multiple systems, the same very high levels of performance are also required if the sharing of data is to be effective.

A very responsive, low overhead mechanism is supported in SES to support the locking requirements in coupled systems. Very high levels of performance are achieved with special low overhead protocols on the links 24 interconnecting SES 23 with the systems 15. The rules previously recited about serializing execution of commands, providing command atomicity, and storage concurrency are maintained by the present invention even in the presence of real or apparent problems with the links 24, and without requiring the coordination of error recovery for other command initiators. The initiator that detects a possible problem may execute recovery procedures without causing loss of access to data and functions in SES by other attached systems.

With reference to FIG. 2, when a program 19 requires the use of SES 23, it will execute a send message instruction that identifies a channel in the channel subsystem (CSS) 18 and a command in memory 17 that is to be transmitted to SES 23.

With reference to FIG. 3, the command message received on link 24 will be received by a link adapter 32, deserialized and stored by the link hardware and buffers 33. An interrupt signaled to the SES processor 30 will activate the link manager 46 and link message manager 47 program sequences to initiate execution of the command by the proper program module. A response will be formulated, sent to the link hardware and buffers 33, and sent by the link adapter 32 over the link 24 to the command initiator.

Previous discussion has indicated the necessity of preserving the serial execution of commands by SES to insure consistent and accurate values for data shared by plural command initiators. When command execution results in various errors, it is necessary for commands to complete with data left in an accurate state. Commands can complete successfully or, through techniques well known, be "backed out". That is, any changes made to data before the error will be returned to a previous state as if the command had not started execution. The response normally returned to the program that initiated a command will reflect the status of the command completion, whether correctly or with an error.

After a channel subsystem (CSS) has responded to a send message instruction of a command initiating program, the CSS may determine that the link 24 to SES 23 may be in error after the message was transmitted or the CSS may detect an error in the process of executing a send message instruction. When the CSS or link adapter 32 on a link 24 are not transmitting data, they exchange idle characters to maintain synchronism. If the idles are not received by a CSS, it will indicate this fact in a status indicator and store a status pending state in a subchannel to be defined subsequently. An apparent error would be signified by the failure of the CSS to receive a response back from SES after a predetermined time from sending the command. A reason the response has not been received could be the result of SES being too busy, and that although the command is executing, the response has not yet been formulated and returned. This too will provide a status pending state. The command initiating program will test the status pending state, and if set will execute a test subchannel instruction to obtain the error status. Recovery procedures can then be initiated by the command initiating program using the functions provided by the present invention using retry buffers, and to be more fully explained.

When the error is posted to the subchannel where it is observable by the program, there are two requirements that must be met to retain proper command serialization at SES, and provide proper recovery action by the command initiating program that does not require coordination with any other command initiating program. First, the program must know the command execution has been quiesced, whether correctly to completion or as if not at all. Second, any commands received subsequently from any other command initiating program must not start execution at SES until it is known that the quiesced command for which error has been posted has either ended to completion or will not execute at all.

A command quiesce function is provided in SES 23 to achieve the two requirements. In FIG. 3 one of the global objects 35 in bulk storage 34 is an indicator vector 51. The indicator vector 51 is comprised of a binary bit for each of the link adapters 32 provided with SES 23. In the example shown there will be eight bits in the indicator vector 51. The command quiesce function is described in co-pending application Ser. No. (PO9-91-062) and will not be repeated here.

Returning now to FIG. 3, one additional global object 35 in bulk storage 34 will be identified. That is status storage 63. A command initiating program can selectively set aside an area in bulk storage 34 for the purpose of collecting and storing status and/or data for commands as they execute in SES 23. At any time, whether as part of recovery from the previously described command quiesce function, or for any reason, the program can access the status storage area 63 for the purpose of determining the ending status of a command. The structure and use of this area, representing the present invention will now be described.

Figure 4:
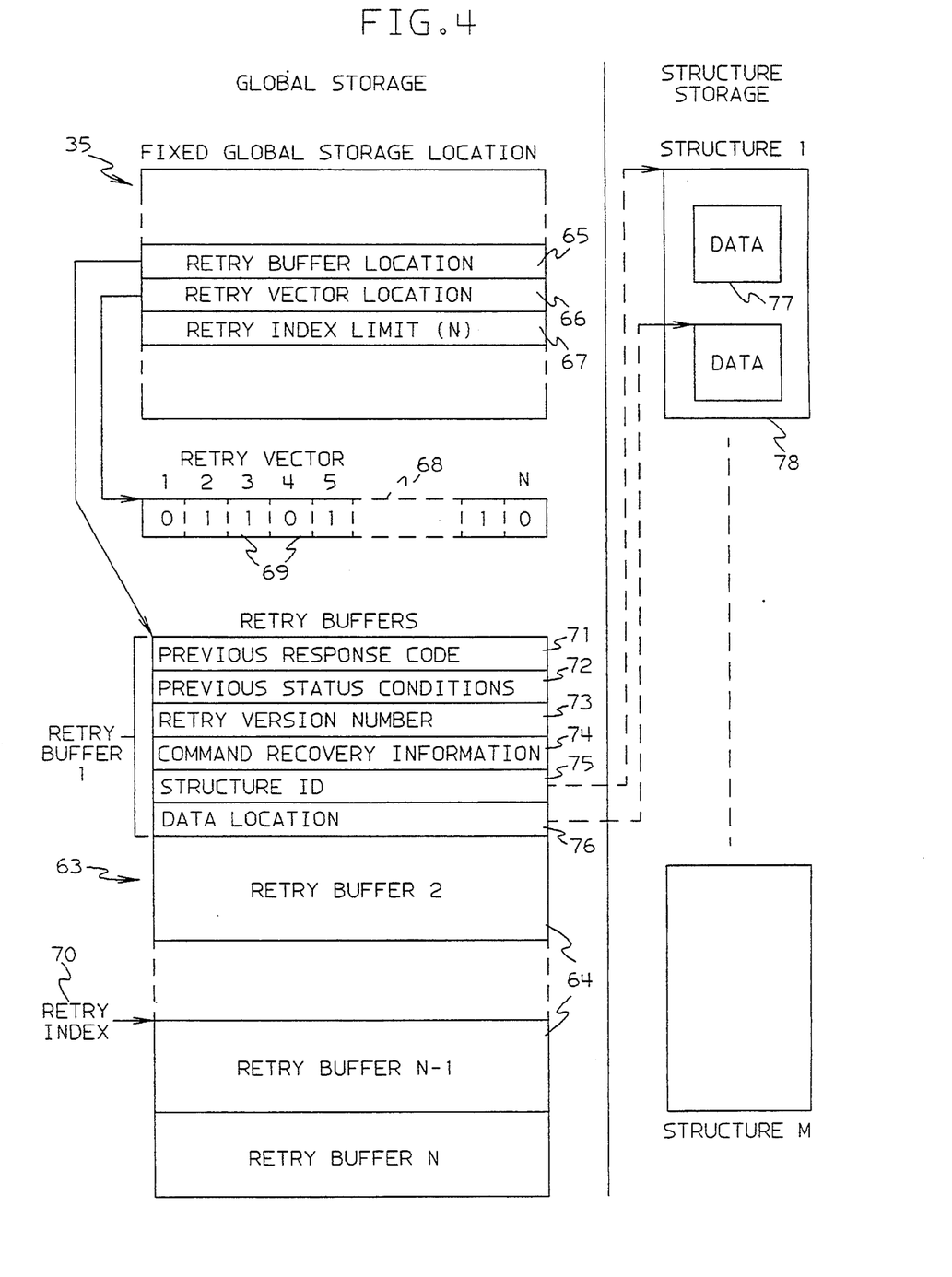
FIG. 4 is a block diagram of the logical implementation of retry buffers in SES in accordance with the present invention.

FIG. 4 shows additional detail of the status storage 63 referred to in FIG. 3. Status storage 63 is part of the global storage 35 providing control structures for the Sysplex formed by plural CPC's 15. Status storage 63 is divided into a plurality of fixed sized portions identified as retry buffers 64. The structure of SES and programming will establish a maximum number N of retry buffers 64 provided in the system. In addition to the retry buffers 64, four other entries in global storage are used in practicing the invention. These are a retry buffer location pointer 65, retry vector location pointer 66, retry index limit 67, and a retry vector 68. The use of these values will now be explained.

The retry buffer location pointer 65 addresses the beginning address of contiguous locations comprising the N retry buffers 64. This is fixed in each SES and is not available to initiators. The retry index limit 67 is fixed, and indicates the maximum number N of retry buffers 64 that can be assigned to initiators. It is the retry index that is used by initiators when a retry buffer is requested for use during command execution.

A feature of the present invention is that retry buffers 64 need not be permanently assigned to particular programs or command initiators which would require a relatively large number for all possible initiators. Rather, the retry buffers 64 are dynamically assigned to initiators as needed for particular programs and series of commands. The retry vector 68 is used for this purpose.

When a program or initiator requires use of a retry buffer 64, two commands are issued to SES. The first is read retry vector. This command, when executed, returns the retry vector 68 and retry index limit 67 to the initiator. The retry vector 68 is comprised of a binary bit 69 for each of the N retry buffers 64 implemented in SES. If the corresponding retry buffer 64 is assigned, the binary bit 69 is in the binary "1" state. If available, it is "0". The initiator examines the retry vector 68, selects a bit position in the "0" state, and issues another command,set retry buffer,which includes a field called retry index 70 which has a value equal to the bit position selected and thus a particular retry buffer 64. Execution of this command sets the corresponding bit position 69 in the retry vector 68 in global storage 35 to "1".

Several CPC's, programs, or initiators will be requesting assignment of retry buffers 64. When an initiator requests setting of a bit in the retry vector 68, and SES finds it is already assigned to another initiator, a response will be returned to the second initiator indicating the set retry buffer command has not been executed. The second initiator will issue the read retry vector command again, and attempt reservation of another retry buffer 64 based on the current contents of the retry vector 68. When an initiator no longer requires use of a retry buffer, it will issue a command identifying the retry buffer by its retry index, and cause the corresponding bit 69 in the retry vector 68 to be reset to "0".

When a retry buffer 64 has been assigned to an initiator, its position will be reflected by the retry index 70. When the initiator requires status to be recorded in the reserved retry buffer, the command will contain a field with that number. If the retry index number field is zero, SES need not execute the program sequences needed to store the status information thus increasing performance of SES by not performing status storage when that is not required by certain commands issued by an initiator.

FIG. 4 shows the information that is stored by SES when a retry buffer is designated by a retry index number 70 in a command. The previous response code 71 and previous status conditions 72 are normally returned in response to command requests. They reflect the basic state of data and structure in SES resulting from receipt of the command. They inform the initiator/program that execution completed correctly or did not complete. If the command did not complete, the basic reason for that result such as a hardware or program error, or the data to be affected was not in a consistent state with the action to be performed by the command is stored in these fields.

When a command is issued by an initiator that designates a retry buffer 64, a field in the command will contain a version number which is a unique value for the command as it relates to other commands issued in a sequence. This value is stored in the retry version number field 73. When a program has been informed of a possible error situation, a read retry buffer command will be issued. The contents of the retry index identified retry buffer will be returned. The program, as part of recovery will compare the retry version number 73 returned with the version number of the command in doubt. If equal, the remainder of the retry information is valid for the command in doubt. If not equal, then the information relates to another command, and the command in doubt will be reissued.

The remaining retry information stored includes other command specific command recovery information 74, structure ID 75, and data location 76. A command issued to SES that operates on data normally identifies that data by a name or ID. SES uses that information to transform the names to a physical location in structure storage referred to in FIG. 3 as cache objects 36 or list objects 37. When a retry index is specified with a command, and that command was to return data to the initiator, execution of the read retry buffer command will cause the structure ID 75 and data location 76 to be used to return the data 77 from the identified structure 78 to the initiator.

Figure 5:
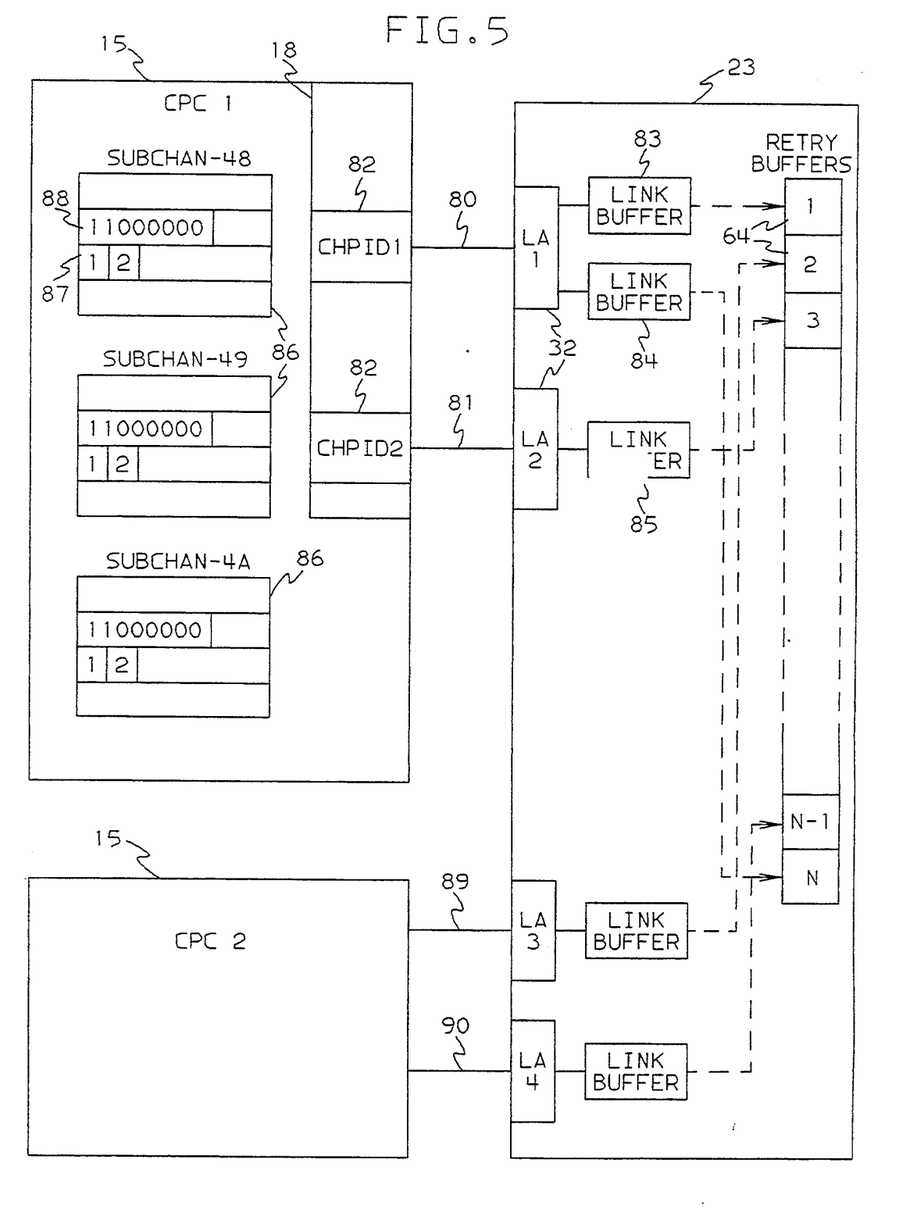
FIG. 5 is a block diagram showing the relationship between a CPC and SES in practicing the present invention with regard to retry buffers.

FIG. 5 depicts the relationship between some of the structure and function of a CPC 15 and channel system 18 of FIG. 2 as they relate to the assignment of retry buffers 64 in SES 23. CPC 1 is connected to SES 23 by two paths 80 and 81. The channel system 18 has structure and logic 82 connected to the paths 80 and 81 designated as CHPID 1 and CHPID 2 (Channel Path ID). At the other end of paths 80 and 81 are link adapters (LA) 32, also shown in FIG. 3. These are designated as LA 1 and LA 2. FIG. 3 also shows link hardware and buffers 33, and these are shown as link buffers 83,84, and 85. Each link buffer can store a command, any associated data, and a response to the command including data.

A CPC 15, such as CPC1, will have a large number of subchannels 86. A subchannel is a control block in main memory of a CPC 15, and is normally associated with a particular I/O device. Some subchannels will be configured to respond to I/O instructions, and others to respond to message instructions. Message subchannels are the ones that are used for sending commands to SES 23. During initialization of a CPC 15, message subchannels 86 will be identified. A number of control tables will be created. During the process, each message subchannel 86 will be analyzed for associated CHPID's. The associated path will be interrogated, and SES will return its ID and indicate for each path, the number of link buffers on the path. As shown in FIG. 5, CPC1 has established three subchannels 86 for communicating through CHPID's 1 and 2 with the three link buffers 83, 84, and 85. Three represents the maximum number of commands that can be handled concurrently by SES 23 for CPC1.

Each subchannel 86 includes fields 87 for identifying useable CHPID's. Also included is a logical path mask 88 of binary bits for each CHPID. During operation of the CPC and SES, certain of the paths 80 or 81 may become inoperable, so the associated bit will be set to "0" preventing use of the path by the subchannel. As shown in FIG. 5, CPC1 has three link buffers to use, and can therefor have up to three retry buffers 64 reserved for use. Since CPC1 has two paths 80 and 81 to SES, if one path fails, access to a reserved retry buffer 64 is still possible over the other path.

FIG. 5 shows CPC2 connected to SES 23 over two paths 89 and 90 through LA3 and LA4, each with one link buffer. CPC2 can therefor reserve two retry buffers 64 for use. The reservation by CPC2 takes place with that of CPC1, each reserving a retry buffer 64 from those available dynamically.

While we have illustrated and described a preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by Letters Patent is:

1. A data processing system comprising:
 a command responder including program controlled command execution means, program sequencing means connected to said command execution means control storage and data storage, said control storage including a command status storage area comprised of a plurality of portions for recording the progress of command execution; and
 a command initiator connected to said command responder for communicating commands to said command responder requesting an action to be performed by said command execution means and return of a response resulting from the action
 said program sequencing means responding to first commands of a first type sent by said command initiator identifying a portion of said command status storage area for reserving the portion identified by said first command of a first type,
 and said program sequencing means responding to a second command of a second type from said command initiator selectively identifying said reserved portion, for selectively storing status information related to said second command in said reserved portion.

2. A data processing system in accordance with claim 1 wherein:
 said program sequencing means, responding to a third command of a third type from said command initiator, for specifying said reserved portion and for communicating said status information to said command initiator.

3. A data processing system in accordance with claim 2 wherein:
 said program sequencing means responding to a fourth command of a fourth type from said command initiator, for specifying said reserved portion and releasing said reserved portion for use by another command initiator.

4. A data processing system in accordance with claim 3 further comprising:
 a plurality of independent and complete communication paths connecting said command initiator to said command responder, wherein said first, second, third, or fourth commands are communicated to said program sequencing means over any operational one of said independent and complete communication paths.

5. A data processing system in accordance with claim 4 wherein:

said control storage further includes;

a retry vector comprised of a binary bit corresponding to each of a plurality of said portions of said command status storage area, each portion comprising a retry buffer, the first or second binary state of a binary bit signifying that the associated retry buffer is reserved or un-reserved respectively, said first commands sent by said command initiator are comprised of, one command requesting communication of said retry vector to said command initiator, and another command sending a retry index number corresponding to the position in said retry vector of a binary bit in said second binary state, and said command responder includes;

means for setting the binary bit in said retry vector in said control storage, corresponding to said retry index number to the first binary state, thereby reserving the corresponding retry buffer for use.

6. A data processing system in accordance with claim 5 wherein said second command from said command initiator includes;

a retry index number field and a retry version number field, said command execution means responding to a non-zero retry index number in said retry index number field for storing a retry version number and command related status information in said retry buffer specified by said retry index number, said retry version number having a value unique to each of several commands specifying the same retry buffer.

7. A data processing system in accordance with claim 6 wherein:

said command initiator includes;

means responding to said retry version number in said status information returned by said command responder in response to said third command for determining if the remainder of said status information is valid.

* * * * *